Dec. 4, 1934.    J. JONAS    1,983,085

GROUNDING PROTECTION SYSTEM FOR HIGH VOLTAGE SYSTEMS

Filed Nov. 5, 1929

Inventor
Julius Jonas
By *(signature)*
Attorney

Patented Dec. 4, 1934

1,983,085

UNITED STATES PATENT OFFICE 1,983,085

GROUNDING PROTECTION SYSTEM FOR HIGH VOLTAGE SYSTEMS

Julius Jonas, Baden, Switzerland, assignor to Aktiengesellschaft Brown Boveri & Cie, Baden, Switzerland, a joint-stock company of Switzerland Application November 5, 1929, Serial No. 404,972
In Germany November 8, 1928

7 Claims. (Cl. 171—97)

This invention relates to improvements in protective means for high voltage alternating current distribution systems and, particularly, to means for suppressing grounds or earth faults in such systems.

High voltage alternating current systems may be grounded by excess atmospheric voltages, breaking of one or more of the phase conductors by falling poles or trees, heavy sleet, etc. Such grounds cause arcs which tend to increase in intensity and are likely to cause insulator failures, or failures of apparatus in the circuit, excess voltages and the like thereby causing interruptions in the continuity of service. Grounded inductance coils connected to a neutral point of the network have been used as protection against earth faults. Such coils are usually proportioned to form a resonant circuit with the capacity of the system to ground as determined by the fundamental frequency of the source. In such case, suppression of the fundamental ground current only is possible and the harmonics of the ground current cannot be suppressed, and it is more advantageous to provide dissonant circuits for this purpose.

For the purposes of this specification, resonance in a three phase alternating current system between an inductance L connected at the neutral point of the system and the capacity of the system, being the sum of the partial capacities of each phase conductor to ground, may be defined by the formula $$L - \frac{1}{\omega^2(C_1 + C_2 + C_3)} = 0$$

in which the partial capacities $C_1$, $C_2$, $C_3$ of the several phases of the system are usually slightly different. Dissonance or dissonance coincidences will be defined by the formula $$L - \frac{1}{\omega^2 3C} = 0$$

in which C is a capacity value outside the range lying between the highest and the lowest individual phase capacities relative to ground.

It is, therefore, among the objects of the present invention to provide means for the protection of high voltage systems against grounds by the use of inductances which, either alone or in combination with others, form circuits for conductively grounding such systems.

Another object of the invention is to provide grounded inductances connected with a high voltage system, which inductances, either alone or in combination, are connected with resonant or dissonant circuits determined by the wave frequencies of the ground current.

Figure 1:
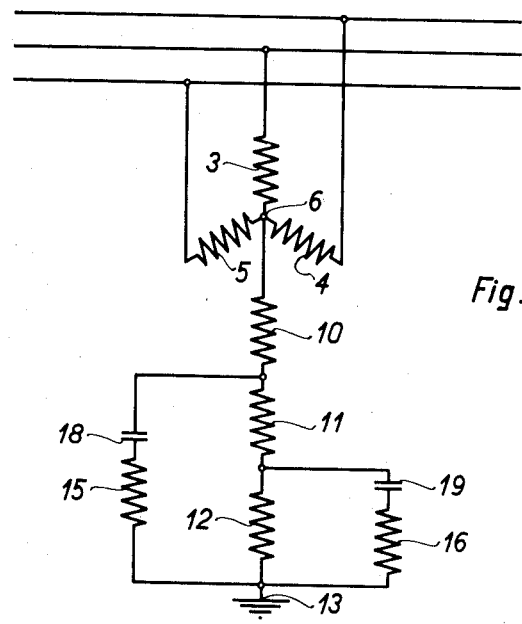
Figure 2:
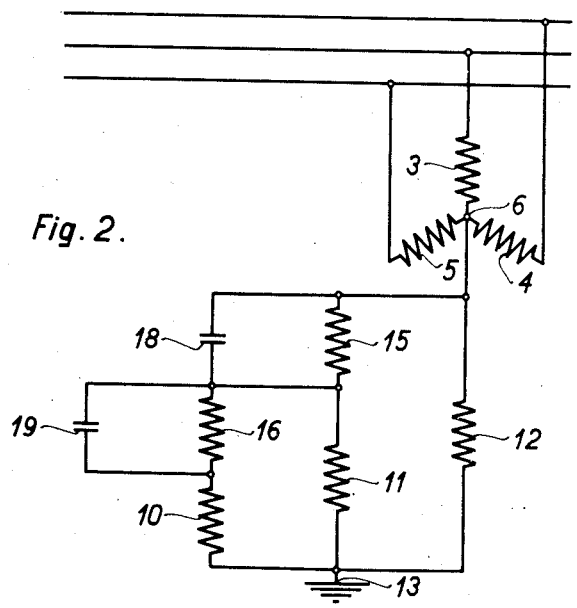

Objects and advantages, other than those above set forth, will be apparent from the following description and in the drawing, in which, Figure 1 is a diagrammatic representation of one embodiment of the present invention, and Fig. 2 is a modified form of the present invention, diagrammatically shown.

Referring more particularly to the drawing by characters of reference, the reference numerals 3, 4, 5 indicate the several phase windings of a three phase transformer or generator connected to a supply line, which phase windings are interconnected at the neutral point 6. Inductances 10, 11 and 12 are connected in series between the neutral point 6 of the several phases 3, 4, 5 and are grounded as indicated at 13. A plurality of shunt circuits, including the inductance coils 15 and 16 and the capacities 18 and 19, are arranged in connection with the inductances 10, 11 and 12, as will be hereinafter set forth.

In Fig. 1, the main inductances 10, 11 and 12 are shown as connected in series. The main inductance 10 is so proportioned that it is in resonance with the transmission lines for a current of the fifth harmonic which flows in the inductance 10 and a resonant circuit formed by the inductance coil 15 and the capacity 18. The inductances 11 and 12 are accordingly short-circuited, by the resonant circuit 15, 18, for the fifth harmonic of the line current.

The proportions of the main inductance 10 may be determined by the following equation;

$$L_{10} - \frac{1}{\omega_n^2 3C} = 0$$

in which $L_{10}$ is the inductance of the coil 10; $\omega_n$ is the product of $2\pi$ times the frequency of the $n$th harmonic, in this case the fifth or $2\pi \times 5 \times$ the fundamental frequency; and C is the partial capacity of a phase with respect to ground. The proportions of the inductance coil 15 may be determined by the equation;

$$L_{15} - \frac{1}{\omega_n^2 C_{18}} = 0$$

in which $C_{18}$ is the capacity of the capacitance 18.

The main inductance 11 is so proportioned that, when taken in combination with the inductances 10 and 15 and the capacitance 18, there is resonance with the capacitance 3C for the third harmonic. The inductance 12 is short-circuited by the resonance circuit 16, 19 tuned for the third harmonic. The proportions of the main inductance 11 may be obtained from the equation;

$$L_{10} + \frac{L_{11}\left(L_{15} - \frac{1}{\omega_3^2 C_{18}}\right)}{L_{11} + L_{15} - \frac{1}{\omega_3^2 C_{18}}} - \frac{1}{\omega_3^2 3C} = 0$$

The proportions of the inductance coil 16 may be obtained from the equation;

$$L_{16} - \frac{1}{\omega_3^2 C_{19}} = 0$$

The inductance 12 is so proportioned that, taken in combination with the inductances 11 and 10, 15 and 16, and the capacitances 18, 19, resonance with the capacitance 3C for the fundamental frequency is obtained. The inductance $L_{12}$ may be calculated from the following equation:

$$L_{10} + \frac{L_{11} + \frac{L_{12}\left(L_{16} - \frac{1}{\omega^2 C_{19}}\right)}{L_{12} + L_{16} - \frac{1}{\omega^2 C_{19}}}\left(L_{15} - \frac{1}{\omega^2 C_{18}}\right)}{L_{11} + \frac{L_{12}\left(L_{16} - \frac{1}{\omega^2 C_{19}}\right)}{L_{12} + L_{16} - \frac{1}{\omega^2 C_{19}}} + L_{15} - \frac{1}{\omega^2 C_{18}}} - \frac{1}{\omega^2 3C} = 0$$

in which $L_{10}$, $L_{11}$, $L_{15}$, $L_{16}$ denote inductances of the several coils indicated by the reference characters 10, 11, 15 and 16; the capacities are indicated by $C_{18}$ and $C_{19}$ and $\omega$ indicates the $2\pi \times$ the fundamental frequency. It may be seen from the above that the inductances 10, 11 and 12 when connected in series, either alone or in combination, are bridged by resonant circuits 15, 18, and 16, 19 in such a manner as to be responsive to different harmonics and to be short-circuited for a particular frequency. Protection is accordingly afforded by the arrangement shown to the fundamental and the third and fifth harmonic frequencies of a high voltage system. It will be apparent from the above that the number of main inductances and resonant circuits may be increased as far as desired to provide protection for any other frequency.

The embodiment of the invention shown in Fig. 2 differs from that above described in that the main inductances 10, 11 and 12 are connected in parallel rather than in series. The main inductances 10, 11 and 12 herein likewise operate either alone or in combination with others of the inductances and the resonant circuits 15, 18 and 16, 19 in such a manner that the resonant circuits block the passage of certain harmonics. The fundamental frequency may flow through only inductance 12 because resonant circuit 15, 18 is so tuned as to block flow of the fundamental frequency therethrough. The third harmonic may flow through the main inductances 11 and 12, but is prevented from passing through the main inductance 10 by the resonant circuit 16, 19 tuned to this harmonic. The fifth harmonic may flow through the entire system included between the neutral point 6 and the ground 13.

Equations similar to those above given in the discussion of Fig. 1 are also to be used in determining the proportions of the coils as arranged in Fig. 2.

It will be understood that the several inductances need not be in resonance coincidence, but that the dissonance coincidence may avoid a voltage displacement at normal operation due to the unbalance of the different phases in their capacities to ground. Damping resistances may also be connected in parallel with the several inductances without materially altering absorption of the harmonics. The several inductances need not be connected to the same neutral point in the network, but may be connected at widely separated points.

Although but two embodiments of this invention have been illustrated and described, it will be understood that various other embodiments are possible, and that various changes may be made without departing from the spirit of the invention or the scope of the claims.

The invention claimed is:

1. In a protective system, the combination of, an alternating current high-tension transmission line having a neutral point, a plurality of magnetically independent inductances serially connected between said point and ground, and means comprising a plurality of capacitances and auxiliary inductances, so proportioned and connected across certain of said first mentioned inductances as to provide an approximately resonant circuit for neutralizing the flow of ground fault currents of fundamental frequency and at least two harmonics thereof.

2. In a protective system, the combination of, an alternating current high-tension transmission line having a neutral point, a plurality of magnetically independent inductances serially connected between said point and ground, and means comprising a plurality of capacitances and auxiliary inductances, so proportioned and connected across certain of said first mentioned inductances as to provide a plurality of local circuits which are resonant to a fundamental frequency and harmonics thereof different from the fundamental frequency of the alternating current carried by said line and the harmonics thereof.

3. In a protective system, the combination of, an alternating current transmission line having capacitance between the conductors thereof and ground and having a neutral point, a plurality of inductively independent reactance coils, one of said coils being so proportioned and connected between said neutral point and ground as to constitute an approximately resonant path to ground for the flow of ground fault current of fundamental frequency, condensers and inductances so proportioned and connected with other of said reactance coils as to constitute a plurality of other approximately resonant paths between said neutral point and ground for the flow of ground fault currents of harmonic frequencies relative to said fundamental frequency.

4. In a protective system, the combination of, an alternating current transmission line having capacitance and also having a neutral point, a plurality of reactance coils, one of said coils being connected between said neutral point and ground and so proportioned as to be approximately resonant with said capacitance at the fundamental frequency of said alternating current line upon occurrence of a ground fault, and an inductance and a capacitance so connected with another one of said coils between said neutral point and ground as to be approximately resonant with the capacitance of said line at a harmonic of said fundamental frequency upon occurrence of a ground fault.

5. In a protective system, the combination of, a capacitively reactive transmission line having potentials of predetermined frequency impressed upon the respective conductors thereof, a neutral grounding reactor connected between a neutral point of said line and ground and being so proportioned as to be resonant with the capacitive reactance of said line for ground fault current of a frequency approximately equal to said predetermined frequency, a second independent ground fault current path between said neutral point and ground comprising means for blocking the flow of ground fault current of the second said frequency and means for causing resonance with the capacitative reactance of said line for components of ground fault currents having a frequency approximately equal to a harmonic of said predetermined frequency, whereby dissonance relative to said predetermined frequency and its harmonics is obtained.

6. In a protective system, the combination of, a capacitively reactive transmission line having potentials of predetermined frequency impressed upon the respective conductors thereof, a neutral grounding reactor connected between a neutral point of said line and ground and being so proportioned as to be resonant with the capacitative reactance of said line for ground fault current of a frequency approximately equal to said predetermined frequency, a plurality of other ground fault current paths between said neutral point and ground independent of said grounding reactor and comprising means for blocking the flow of ground fault current of the second said frequency and means for causing approximate resonance with the capacitive reactance of said line for currents having frequencies which are harmonics of said predetermined frequency.

7. In a protective system, the combination of, a multi-conductor alternating current transmission line having capacitive reactance and a neutral point, an inductive reactance connected between said neutral point and ground for neutralizing the capacitive reactance of said line relative to one frequency when a ground fault occurs on one of said conductors, a plurality of other inductive reactances connected between said neutral point and ground and forming paths for the flow of ground fault currents in said line independently of the path formed by the first said inductive reactance, the said plurality of inductive reactances being so dimensioned as to neutralize the capacitive reactance of said line relative to harmonics of said frequency during the flow of ground fault current, and means for blocking the flow of ground fault currents of certain frequencies through said other inductive reactances.

JULIUS JONAS.